United States Patent [19]

Grube et al.

[11] Patent Number: 5,440,758
[45] Date of Patent: Aug. 8, 1995

[54] METHOD OF PREVENTING UNAUTHORIZED ACCESS TO A WIRELESS COMMUNICATION SYSTEM

[75] Inventors: Gary W. Grube, Palatine; Timothy W. Markison, Hoffman Estates, both of Ill.

[73] Assignee: Motorola, Inc., Schaumburg, Ill.

[21] Appl. No.: 226,537

[22] Filed: Apr. 12, 1994

[51] Int. Cl.⁶ ............................................. H04B 1/60
[52] U.S. Cl. ...................................... 455/9; 455/34.1; 455/54.1; 379/95
[58] Field of Search ............. 455/15, 17, 26.1, 34.1, 455/34.2, 53.1, 54.1, 54.2, 56.1, 9; 340/825.31, 825.34; 379/59, 63, 95

[56] References Cited

U.S. PATENT DOCUMENTS

| | | | |
|---|---|---|---|
| 4,992,783 | 2/1991 | Zdunek et al. | 340/825.31 |
| 5,239,294 | 8/1993 | Flanders et al. | 340/825.31 |
| 5,274,368 | 12/1993 | Breeden et al. | 340/825.31 |
| 5,282,250 | 1/1994 | Dent et al. | 340/825.34 |
| 5,335,265 | 8/1994 | Cooper et al. | 379/59 |
| 5,335,278 | 8/1994 | Matchett et al. | 455/54.1 |
| 5,337,345 | 8/1994 | Cassidy et al. | 379/95 |

*Primary Examiner*—Reinhard J. Eisenzopf
*Assistant Examiner*—Andrew Faile
*Attorney, Agent, or Firm*—Timothy W. Markison; Christopher P. Moreno

[57] ABSTRACT

In a wireless communication system, unauthorized access may be prevented upon detecting the particular type of identification code. When the identification code is of a default enabled type, the central controller (101) transmits a default enabled message to the system manager (110). The system manager interprets this message and provides a response to the central controller (101). The response may indicate that this particular identification code should be activated or deactivated.

11 Claims, 3 Drawing Sheets

METHOD OF PREVENTING UNAUTHORIZED ACCESS TO A WIRELESS COMMUNICATION SYSTEM

FIELD OF THE INVENTION

This invention relates generally to wireless communication systems, and in particular, to a method for preventing unauthorized access to a private communication system.

BACKGROUND OF THE INVENTION

Wireless communication systems are known to include a central controller, a plurality of communication units, communication resources, and repeaters that transceive the communication resources. In such communication systems, communication units are generally grouped by like function or usage. For example, communication units operated by a police department may be grouped together. This group may be further divided into subgroups based on police districts. While another group of communication units may be operated by a fire department which may also be divided into subgroups.

Typically, in communication systems, the groups do not communicate with each other. This is the case when one group of communication units is operated by a trucking company and another group of communication units is operated by a taxi cab company. In such a system, which is referred to as a shared communication system, one group will not communicate with the other groups, nor are they aware of the other groups. By having a variety of groups independently operating on a system, the system is operated closer to its maximum capacity, thus reducing the cost for the user. But, under heavy use of the system, some requests for communication will be delayed, which is a trade off for the reduced cost.

If the user cannot afford the delay in processing communication requests or requires the groups to communicate with each other, at least once in a while, the user will want a private system. For example, a municipality generally purchases a private system for their public safety organizations, where the public safety organizations may be a police department, fire department, city government, public works, parks and recreation, and sanitation. Each of these public safety organizations would be a separate communication group, i.e., a group that normally communicates with it members only. But, when a particular emergency occurs within the municipality, such as a fire, the police department and the police department may need to communicate with each other to effectively respond to the fire.

When the user first purchases its private system, or when the private system is reinitialized after a system shutdown, all entries in a communication unit identification code (ID) database are default enabled. The communication unit ID database contains up to 64,000 entries of valid unit IDs. As is known, a valid unit ID must be transmitted by a communication unit with any system service request. Thus, any unit with one of these 64,000 IDs can access the private system.

As is also known, a purchaser of a private system typically purchases less than a few thousand communication units. Thus, only a few thousand of the 64,000 IDs are needed. To allow only the communication units purchased to access the private system, a system manager must "activate" the unit IDs of the purchased communication units and "deactivate" the other unit IDs in the communication unit ID database. This is a relatively simple process where the system manager "activates" the appropriate unit IDs by setting an "active flag" within the communication unit ID database. To "deactivate" a unit ID, the system manager simply sets a "not default enabled flag" for the particular ID. If neither flag is set, as in the case when the system is initialized or reinitialized after a shutdown, all unit IDs are default enabled. Thus, default enabled IDs and activated IDs are valid, i.e., allows a communication unit using one of these IDs to access the private system, and deactivated IDs are invalid, i.e., communication units using one of these IDs will not be allowed access to the private system.

At a cursory view, it would seem to make more sense to deactivate all the IDs at initialization or upon a reinitialization. Thus, guaranteeing that only communication units having activated IDs would be allowed to access the private system. But, upon a closer examination, most private systems are operated by public safety organizations that do not have time to wait for a system manager to activate a few thousand communication unit IDs before they respond to an emergency condition. Thus, the private systems are designed to operate with the default enabled IDs, until the system manager activates and deactivates the unit IDs.

Unfortunately for the purchaser of the private system, if the system manager does not deactivate all of the unused unit IDs, a communication system "hacker" may allow unauthorized communication units, i.e., communication units that were not purchased by the operator of the private system, to access the private system via the unused default enabled IDs. When a hacker uses the unused default IDs, the private system is no longer private, in that, the purchaser of the private system is sharing its system with unauthorized users. Thus, the premium the user paid to have a private system has been wasted.

Therefore, a need exists for a method that prevents unauthorized users to access a communications system.

DESCRIPTION OF A PREFERRED EMBODIMENT

Generally, the present invention provides a method for preventing unauthorized access to a wireless communication system. This is accomplished when a communication system is initialized or reinitialized wherein all available identification codes of communication units are default enabled. During normal use of the wireless communication system, the system manager will activate identification codes by identifying within a database that these are authorized identification codes for this particular wireless communication system. When a central controller receives a system access request from a requesting communication unit, the central determines whether the identification code of the communication unit is an activated identification code or a default enabled identification code. When the identification code of the requesting unit is default enabled identification code, the central controller generates a default enabled message and transmits it to the system manager. With such a method, the system manager will be aware of unauthorized communication units and may then deactivate the unit IDs used by the unauthorized communication units, thus keeping the private communication system a private communication systems.

Figure 1:
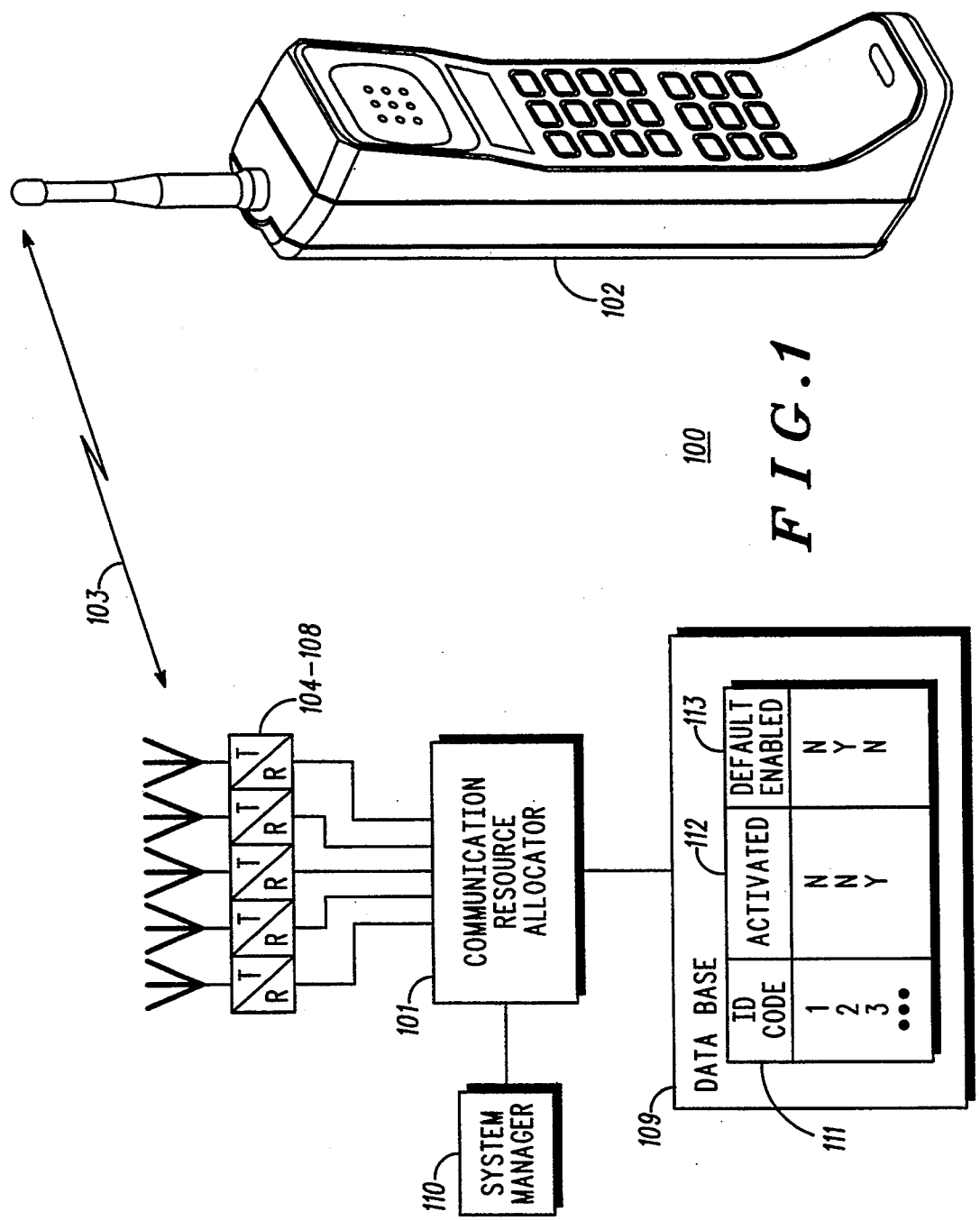
FIG. 1 illustrates a communication system that supports the present invention.

The present invention can be more fully described with reference to FIGS. 1-3. FIG. 1 illustrates a wireless communication system 100 that includes a communication resource allocator (101) (central controller), a plurality of communication units (102), communication resources (103), repeaters (104-108), a database (109), and a system manager (110). The database (109) includes an identification code field, an activated field (112), and a default enabled field (113). Within the database, each identification code listed in the identification code field (111) indicates an identification code that may be used by a communication unit to access the communication system.

Typically, the identification code field (112) will have up to 64,000 available entries. In practice, especially in a private communication system, the operator of that system will not have 64,000 communication units operating on the system, but only a few thousand communication units. Thus, the system manager (110) will identify the particular identification codes that these few thousand communication units will use and have the ability then to disable the remaining communication unit identification codes by setting a "no" flag in the default enabled field (113).

As an example, identification code number 1, as shown in FIG. 1, has been deactivated by the system manager (110) because a "no" flag is set in the default enable field (113). As also shown, identification code 2 is shown to be default enabled, i.e., the system manager has not activated this identification code (ID) nor has it been deactivated. Recall that when a system is initialized or reinitialized, all the IDs are default enabled, i.e., a "yes" flag is set in the default enabled field (113) and a "no" flag is set in the activated field (112) for all the IDs. Thus a request from a communication unit using this identification code will be granted by the system. As still further shown, identification code 3 has been activated by the system manager as indicated by the "yes" flag been set in the activation field (112). Thus a communication unit using identification codes 2 or 3 will receive access to the communication system (100) while a communication unit using identification code 1 will be denied access to the system. Note that the identification code is the unique identification code for a particular radio and that in normal operation, each communication unit will have its own unique identification code.

At initialization, or reinitialization, of the wireless communication system, all 64,000 entries of the identification code field will be default enabled. It is the job of the system manager to activate the identification codes of the units that are authorized access (the communication units purchased by the user to operate on the private system) to the system and to deactivate the remaining identification codes. In some circumstances, the system manager is unable or fails to perform this task thus potentially allowing unauthorized communication units (communication units that received a valid default enabled ID from some source other than the manufacturer or the purchaser of the system) to utilize the default enabled identification codes and access the private communication system.

Figure 2:
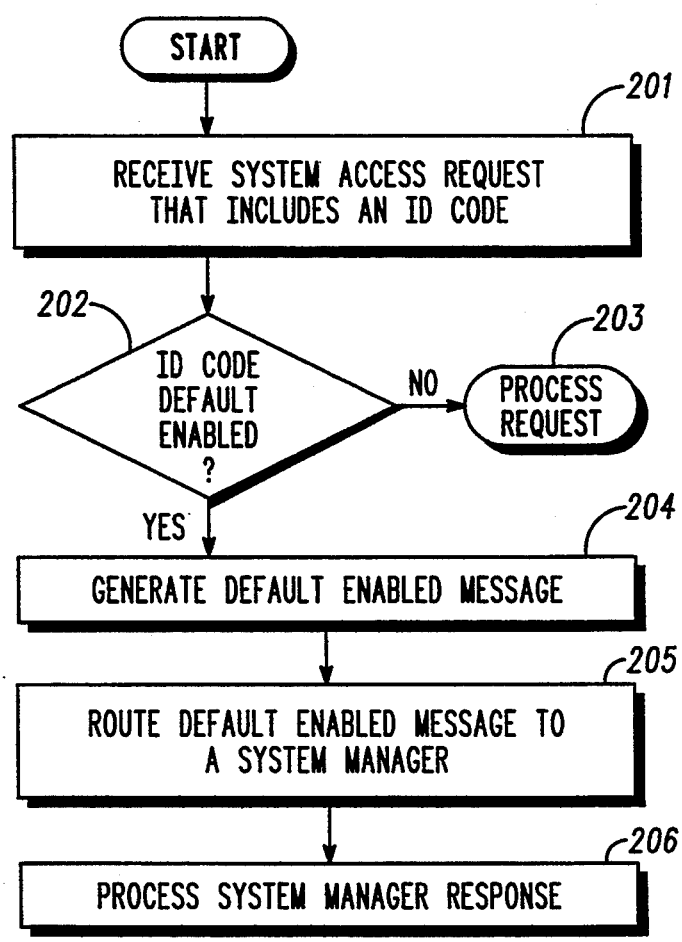
FIG. 2 illustrates a logic diagram that may be used to implement the present invention.

FIG. 2 illustrates a logic diagram that may be implemented in to the wireless communication system 100 to prevent unauthorized communication units from accessing the system. At step (201), the central controller receives a system access request from a requesting communication unit, wherein the system access request includes an identification code of the requesting communication unit. Having received the request, the central then determines whether this particular identification code is default enabled (202). Recall that a default enabled ID may be an identification code that the system manager has not selected to be an activated or a deactivated identification code. When the identification code is not default enabled (202), the request is processed normally (203). That is, when the ID is an activated ID, the system access request will be granted, and when the ID is a deactivated ID, the system access request will be denied.

If, however, the identification code is default enabled (202), the central controller generates a default enabled message (204) and transmits this message to the system manager (205). The system manager interprets the message and generates a particular response which is processed by the central controller (206). The system manager may generate a variety of responses. For example, the system manager may instruct the central controller to activate this particular identification code, i.e., indicating that this particular identification code is associated with an authorized communication unit. Alternatively, the system manager may instruct the central controller to deactivate this particular identification code, i.e., indicating that this particular identification code is associated with an unauthorized communication unit.

Figure 3:
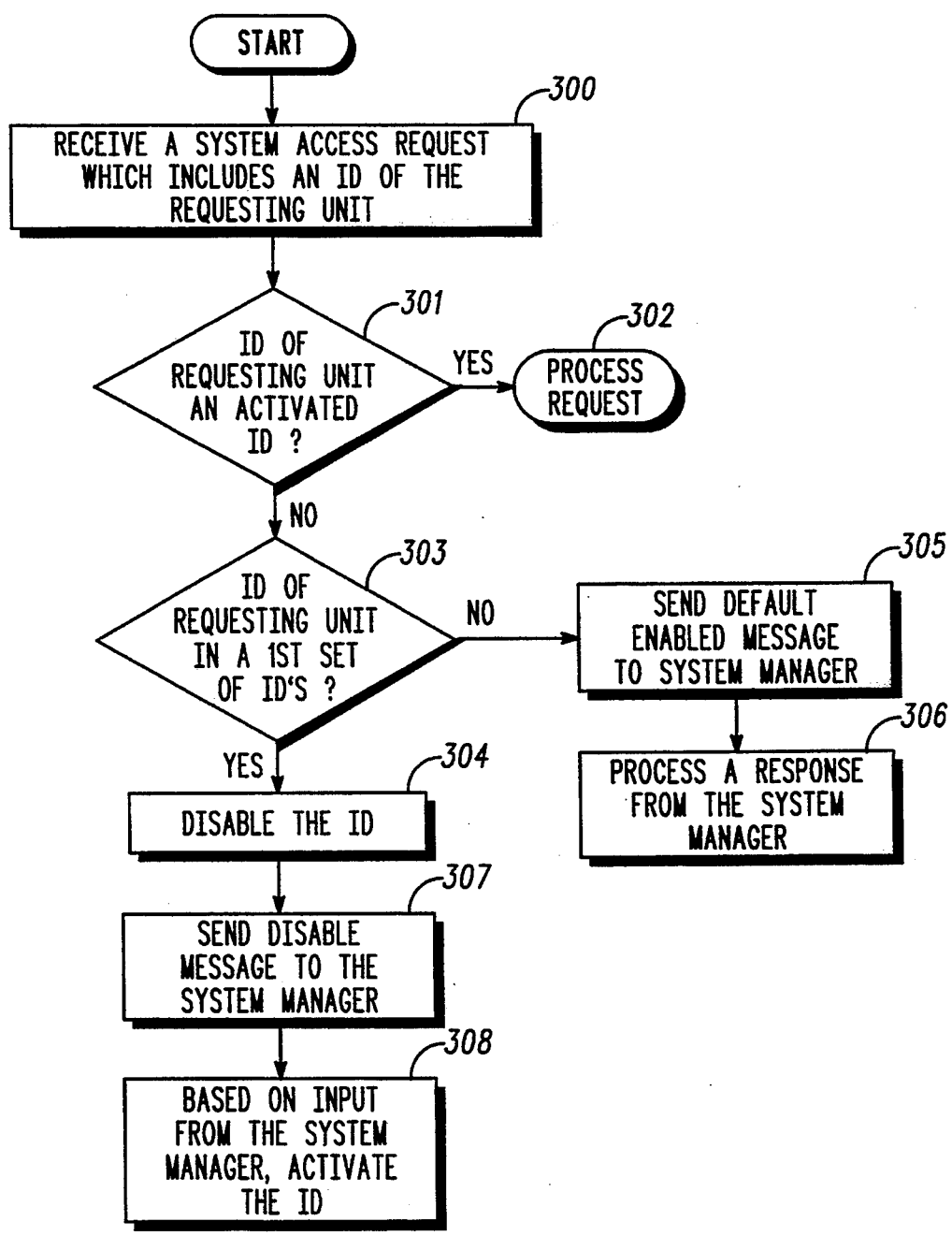
FIG. 3 illustrates an alternative logic diagram that may be used to implement the present invention.

FIG. 3 illustrates an alternative logic diagram that may be used to implement the present invention. At step 300, the central controller receives a system access request which includes an identification code of the requesting communication unit. The central controller determines whether the identification code is an activated identification code (301). When the identification code of the requesting unit is an activated identification code (301), the central controller processes the request normally (302).

If, however, the identification code of the requesting unit is not an activated identification code (301), the central controller determines whether this identification code is in a first set of identification codes (303). When the identification code is within the first set (303), the central controller deactivates this particular identification code (304) and denies the request. The first set of identification codes may be selected by the system manager or by the manufacturer to include IDs that are not going to be used by the user of the private system. For example, if the system was purchased with only 2,000 communication units, the system manager, or the manufacturer, can identify all identification codes above 2,000 to be within the first set. Thus, the number of identification codes within the first set is solely dependent upon customer needs.

Once the identification code has been disabled (304), the central controller sends a disabled message to the system manager (307). The system manager may decide to activate the ID, which may occur for newly purchased communication units or units that roam in to the coverage area of the system. Upon receiving input from the system manager, the central controller activates this particular identification code (308).

If the identification code is not within the first set of identification codes, the central controller sends a default enabled message to the system manager (305). Having sent the message, the central controller waits for a response from the system manager and upon receiving one, processes it (306). The system manager's response was discuss above with reference to FIG. 2.

The present invention provides a method for preventing unauthorized access to a wireless communication system. With such a method, a private communications system will stay just that a private communication system. By noting when a communication unit requests a system access using a default enabled identification code, a message will be sent to the system manager. The system manager then has the knowledge that a communication unit is utilizing a default identification code. With this knowledge, the system manager can activate that unit, i.e., setting the activated field within the database, or disable that particular identification code. Thus, unauthorized access to a private communication system can be detected and disabled.

We claim:

1. In a wireless communication system, a method for preventing unauthorized access to the wireless communication system, the method comprising the steps of:
   a) during initialization or re-initialization of the wireless communication system, enabling available identification codes as default enabled identification codes;
   b) after initialization or re-initialization of the wireless communication system, activating at least one of the available identification codes corresponding to at least one particular communication unit to produce activated identification codes; during operation of the wireless communication system:
   c) receiving a system access request from a requesting communication unit, wherein the system access request includes an identification code of the requesting communication unit;
   d) determining whether the identification code is one of the activated identification codes or one of the default enabled identification codes; and
   e) when the identification code is one of the default enabled identification codes, generating a default enabled message.

2. The method of claim 1 further comprising the steps of:
   f) routing the default enabled message to a system manager terminal; and
   g) upon input from the system manager terminal, processing a response to the default enabled message.

3. The method of claim 2, wherein step (g) further comprises disabling the identification code.

4. The method of claim 2, wherein step (g) further comprises activating the identification code.

5. In a wireless communication system, a method for preventing unauthorized access to the wireless communication system, the method comprising the steps of:
   a) receiving a system access request from a requesting communication unit, wherein the system access request includes an identification code of the requesting communication unit;
   b) determining whether the identification code is in a set of activated identification codes or a set of default enabled identification codes;
   c) when the identification code is in the set of default enabled identification codes, determining whether the identification code is in a first set of identification codes; and
   d) when the identification code is in the first set of identification codes, disabling the identification code.

6. The method of claim 5 further comprising the step of:
   e) informing a system manager terminal of the disabling of the identification code.

7. The method of claim 6 further comprising the step of:
   f) upon input from a system manager, activating the identification code.

8. The method of claim 5, wherein step (d) further comprises the step of:
   d1) when the identification code is not in the first set of identification codes, generating a default enable message.

9. The method of claim 8 further comprising the steps of:
   e) routing the default enabled message to a system manager terminal; and
   f) upon input from a system manager, processing a response to the default enabled message.

10. The method of claim 9, wherein step (f) further comprises the step of:
    f1) disabling the identification code.

11. The method of claim 9, wherein step (f) further comprises the step of:
    f1) activating the identification code.

* * * * *